United States Patent [19]

Vlahos

[11] 4,100,569
[45] Jul. 11, 1978

[54] COMPREHENSIVE ELECTRONIC COMPOSITING SYSTEM

[76] Inventor: Petro Vlahos, 4111 Van Alden, Tarzana, Calif. 91356

[21] Appl. No.: 838,097

[22] Filed: Sep. 30, 1977

Related U.S. Application Data

[63] Continuation-in-part of Ser. No. 738,740, Nov. 8, 1976, abandoned.

[51] Int. Cl.$^2$ .......................................... H04N 9/535
[52] U.S. Cl. ..................................................... 358/22
[58] Field of Search ....................... 358/22, 40, 81, 82, 358/183

[56] References Cited

U.S. PATENT DOCUMENTS

| | | | |
|---|---|---|---|
| 3,595,987 | 7/1971 | Vlahos | 358/22 |
| 3,778,542 | 12/1973 | Hanseman | 358/22 |

Primary Examiner—Richard Murray
Attorney, Agent, or Firm—Poms, Smith, Lande & Glenny

[57] ABSTRACT

In a system for combining foreground video images with background video images, using the so-called "blue-screen" (or special background color) technique, a comprehensive control system is provided which accommodates a broader range of foreground objects, permits the careful coordination of control of the blue of the foreground with the level of the background signals, and also permits precise shadow control in accordance with the artistic requirements of the scene to be produced. To properly control the level of the blue from the foreground and to properly distinguish between situations where the video signal arises from solid or partially transparent actual foreground objects and where it originates from the blue screen, various electrical adjustments are provided for accommodating different types of foreground objects. One of the adjustments for controlling the blue foreground has three terms, one limiting the level of blue to the amount of green present in the signal, the second permitting an increase in the blue signal in accordance with a function of the positive value of green minus red, and a third term permitting increase of the amount of blue signal in accordance with a function of the positive value of red minus green present in the signal. As will be described in greater detail below, these electronic circuits will handle the more difficult color situations involving, for example, blue eyes which present a difficult problem because of the similarity to the blue background screen; and purple objects which include high red and blue content but little green. The background control signal may also be switched to three different types of control depending on the type of foreground which is being reproduced and included in the composite scene. If desired, the background control signal switch may be mechanically coupled to the switch which limits the blue of the foreground. As in the case of the control of foreground blue, the background control signal may have several terms. In addition to the color terms which may be included in the background control signal, electronic circuitry is provided for both accommodating variations in brightness of the "blue screen" background, and also to control desired shadow effects, from completely eliminating shadows to intensifying them, with the additional capability of providing shadow effects. Special switches are also being provided to switch from composite foreground and background video signal generation to (1) foreground only with background blacked out, (2) foreground complete with blue screen signals out, (3) background only, and (4) background only with foreground blacked out. These switches permit the achievement of various special effects.

27 Claims, 8 Drawing Figures

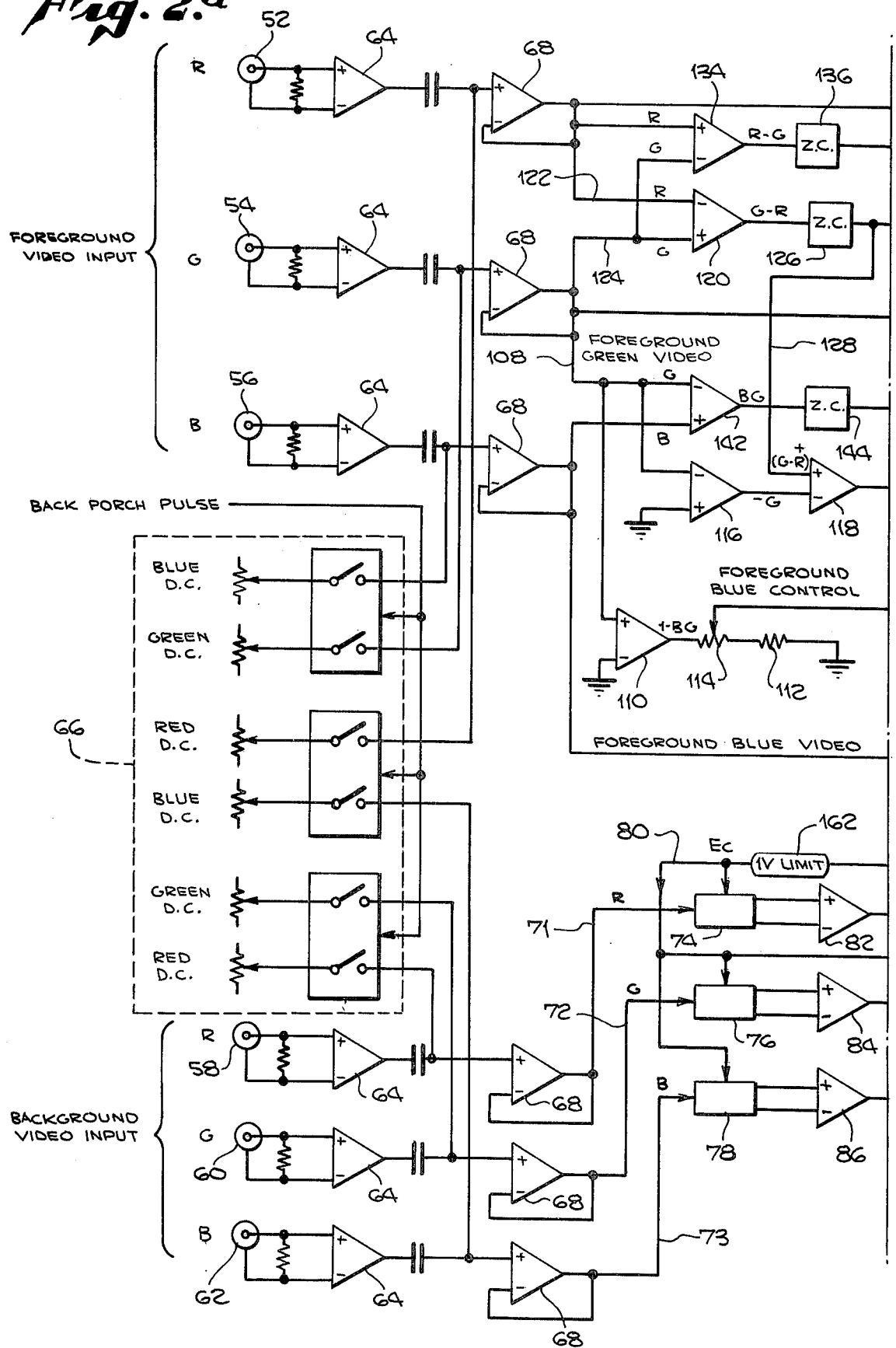

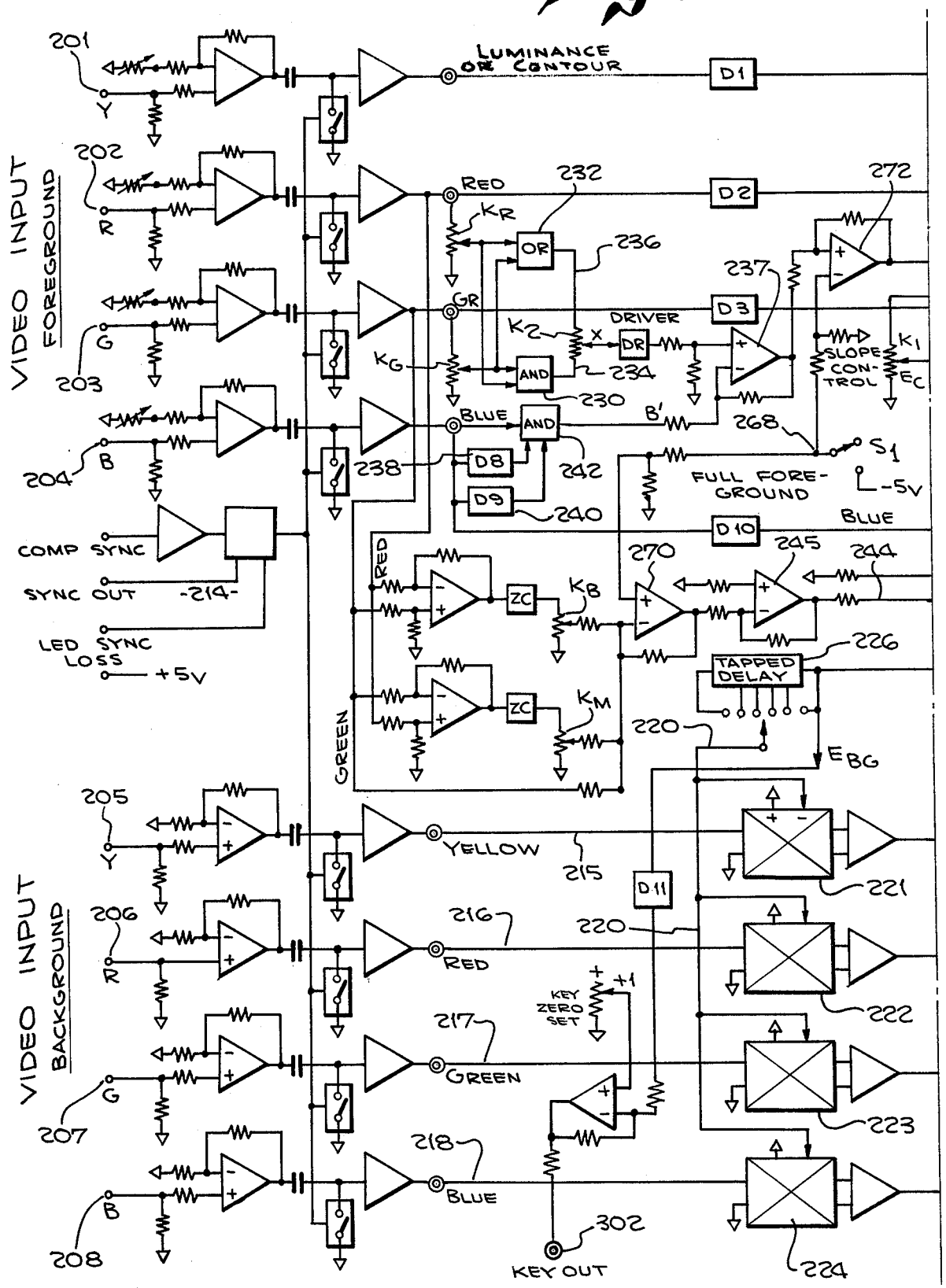
Fig. 3.a

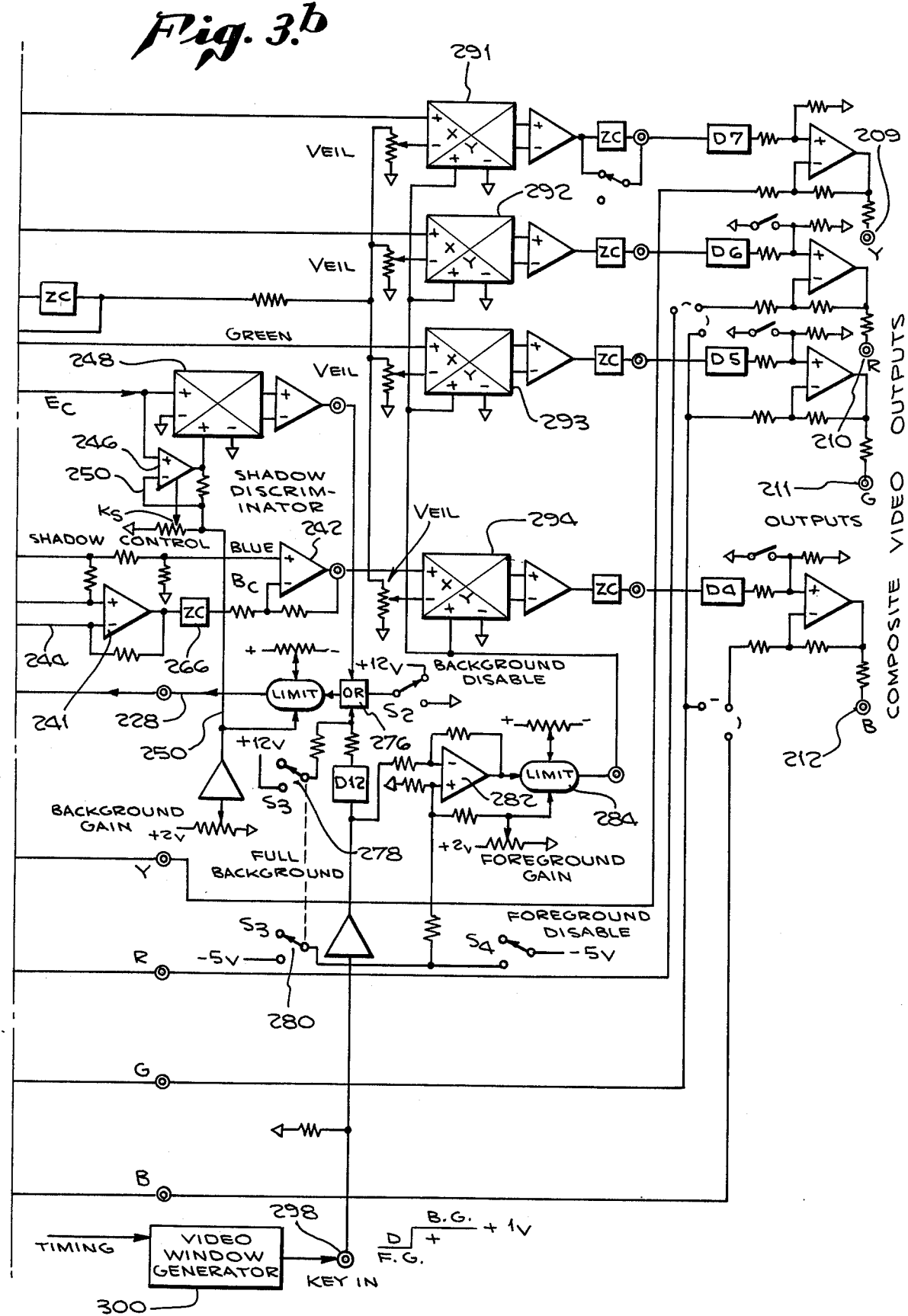
Fig. 3.b

BLUE LEVELS OF SCENE

COMPREHENSIVE ELECTRONIC COMPOSITING SYSTEM

This patent application is a continuation in part of my co-pending U.S. patent application Ser. No. 738,740, filed Nov. 8, 1976, and which was allowed as filed, now abandoned.

BACKGROUND OF THE INVENTION

The present invention relates to the combining of foreground and background scenes for motion picture or television purposes and particularly relates to the so-called "blue-screen" or special background color screen systems.

It has of course been previously proposed to combine foreground and background scenes by electronic techniques. In this connection, reference is made to my prior U.S. Pat. No. 3,595,987 granted July 27, 1971 and entitled "Electronic Composite Photography", and also to my copending U.S. patent application No. 616,685, filed Sept. 25, 1975, and entitled, "Electronic Composite Photography With Color Control", now U.S. Pat. No. 4,007,487, granted Feb. 8, 1977.

In all of the foregoing systems the principle employed to combine the foreground and background scenes involves the use of a so-called "blue-screen", or other single color background. The blue screen is employed as a backdrop for the foreground scene, and is very nearly pure blue in color. Other objects having the same color may also be included in the set. Electronic circuitry is provided for detecting the pure signal and for blocking out or turning off the background video when the foreground scene blocks the blue screen. Conversely, when the foreground signal comes from the blue screen or other objects painted the same color, the blue foreground color from the screen or other pure blue objects must be blocked and the background video signals are raised to full intensity.

My U.S. Pat. No. 3,595,987 dealt with two problems which arise in systems of the type generally discussed above. More specifically, when foreground objects include a blue which approaches the blue of the background screen, but has greater green content, such as blue eyes, arrangements must be made to properly reproduce the blue eyes. For normal foreground scenes it had been found sufficient to limit the value of blue to the level of the green present in the sensed signal. To accommodate blue eyes, blue jeans, or similar light blue colors, it was disclosed in my U.S. Pat. No. 3,595,987 to amplify the green signal by which a comparison was made, and limit the blue to "KG", thus permitting the blue to rise to some multiple such as 1.5 times the level of green present in the foreground signal.

U.S. Pat. No. 3,595,987 also disclosed arrangements for accommodating transparent foreground objects such as smoke, glass, or a rapidly moving hand or arm of a foreground character, which appears blurred and therefore partially transparent. This transparency requirement was handled by controlling the level of background video signals in accordance with the magnitude of the difference between blue and green (or amplified green signal), present in the foreground signal. With a pure blue signal representing the background screen, of course, all of the background video would be gated through. However, as the green content increased the level of the background video was dropped.

My U.S. Pat. application Ser. No. 616,685, now U.S. Pat. No. 4,007,487, discloses certain improvements in electronic color systems of this type. Specifically it discloses the use of special circuitry for removing the red and green impurities of the supposedly pure blue background screen. This is accomplished by the provision of a circuit which is sensitive to the transparency of foreground objects, and applying a correction to the foreground red and green signals proportional to this transparency, thereby reducing the red and green signals from the foreground video proportionally to the amount of signal being derived from the supposedly pure blue background screen, and thus removing the red and green impurities arising from the blue screen.

In accordance with another circuit disclosed in my above-cited U.S. Pat. No. 4,007,487, the blue limiting was subject to two conditions. These two conditions serve to both permit proper reproduction of light blue colors in the foreground, and also to suppress "blue flare", or the coloring, of white or flesh tones by the blue light from the blue screen. In accordance with a first condition the blue is limited to green or to the amplified green signal, which may be designated "KG" as mentioned above; and is also at the same time limited to permitting an excess of the blue signal over the green signal only by the difference between the green and red signals. These double criteria arise from the fact that, in blue eyes or blue jeans, the amount of blue, green, and red are a linear function to a substantial extent, with blue exceeding green and green exceeding red by substantially the same amounts. Accordingly, by permitting an increase of blue over the level of green by the difference between the green and red signals, faithful reproduction of foreground light blue signals, such as denims and blue eyes, may be achieved. On the other hand, blue flare from the blue screen on white or flesh tones includes no excess of green over red, and the limitation of the blue to the level of green or KG is assured, thus eliminating this blue flare problem.

While the foregoing systems were adequate for many purposes, they still had some shortcomings. For example, it was not practical with such systems to handle both light blue objects and also purple or magenta in a single scene. Thus, it would not be practical to include in a cast a blue-eyed queen with purple robes. Also, the control of the background video in the foregoing systems was more limited than would be desired. Specifically, it was not capable of providing the varying degrees of dramatic shadow effects which producers and directors frequently desire, nor was the background video sufficiently flexible or correlated with the control of the foreground blue signal.

Another object of the invention is to provide more switching flexibility in the handling of foreground and background signals of the "blue screen" type.

A principal object of the present invention is to overcome these shortcomings of prior systems, and to provide a more comprehensive and flexible system for the control of both blue foreground signals and the level of background video.

SUMMARY OF THE INVENTION

In accordance with the comprehensive aspect of the present invention an electronic system of the blue screen (or other single color screen) type is provided for combining foreground and background video signals, in which the blue foreground video may be controlled to be not greater than the green foreground video, as augmented by a function of the difference between the red and green foreground video signals; and the entire background video has an intensity level which is generally proportional to the foreground blue video less a function of the foreground green and red video signals, which may be varied to provide optimum performance; and the control signals may be further modified by electronic circuits introducing variable proportionality or multiplier constants, and/or additive or offset constants.

In accordance with an additional feature of the invention, electronic adjustment or switching circuitry is provided which permits varying the weight or the elimination of selected factors for improved results if the foreground scene does not include purple or magenta, or if light blue or cyan colors are not included in the foreground scene.

In accordance with a collateral feature of the invention, special handling of shadows to achieve special or dramatic effects is permitted by the electronic circuitry which provides the background video control signal. This circuitry may also be varied by suitable proportionality constants to accommodate variations in brightness of the "blue screen" background. Through use of this circuitry, shadows may be intensified, or totally eliminated, depending on the effect to be achieved.

In accordance with a collateral feature of the invention, the two variable electronic controls for changing the shadow control constants may be ganged, or coupled to the same control knob, so that separate adjustment is not necessary.

In accordance with an analogous feature of the invention, the foreground blue video selection switch may be ganged with or mechanically coupled to the background video control switch so that they may be operated together.

To summarize the results which are achieved relative to the control of (1) blue foreground video, and (2) background video, the system may be considered in terms of Example A which switches between three principal modes, and Example B in which variable potentiometers are adjusted to accommodate different foreground color combinations. The circuit of Example A may be switched between Mode I, Mode II, and Mode III, where Mode I is applicable to scenes with no light blue or purple foreground colors, Mode II relates to foreground scenes including light blue colors, and Mode III involves both foreground light blue and purple colors.

EXAMPLE A - MODE I: NO FOREGROUND BLUE OR PURPLE

Switch Position No. 1

$$B_c \leq CG \tag{1}$$

where $B_c$ represents the clamped value of the foreground blue video signal,
G represents foreground green, and
C is a constant which may be varied from about 0.5 to 1.5.

$$E_c = K_1(B-G) - K_2 \tag{2}$$

where $E_c$ is the control signal for the background video, giving full background video when $E_c = 1$ and none when $E_c = 0$; and $K_1$ and $K_2$ are the proportionality and offset constants, respectively.

Mode I is the simplest and most reliable mode, and accommodates varying degrees of transparency well, as well as having other advantages.

EXAMPLE A - MODE II: FOREGROUND LIGHT BLUE, BUT NO PURPLE OR MAGENTA

Switch Position No. 2

$$B_c \leq G + (G-R)^+ \tag{3}$$

where R represents the instantaneous value of the foreground red video signal. The plus sign after the parenthesis indicates that only positive values are effective.

$$E_c = K_1[(B-G)^+ - (G-R)^+] - K_2 \tag{4}$$

The control of the foreground blue in switch position No. 2 is as described in my above-cited copending patent application, and permits the foreground blue to rise above the foreground green by the difference between the foreground green and the foreground red. As the blue green and red are normally linearly related for light blue colors, this modification permits the realistic representation of light blue foreground objects.

The additional term in the background video control equation No. 4 is also (G-R), and this serves to bring the entire bracketed function down to zero for light blue objects where (B-G) alone, as in Mode I, would still have a finite value.

EXAMPLE A - MODE III: FOREGROUND INCLUDES LIGHT BLUE AND PURPLE OR MAGENTA $$B_c \geq G + (G-R)^+ + (R-G)^+ \tag{5}$$

$$E_c = K_1[(B-G)^+ - (G-R)^+ - (R-G)^+] - K_2 \tag{6}$$

In both of the above equations Nos. 5 and 6, the new $(R-G)^+$ term modifies the basic equation to accommodate purple or magenta, where the blue is greater than the green, and where the foreground red is also substantially greater than green. In the case of equation No. 5 the new $(R-G)^+$ term permits the foreground video blue to rise above green by this difference, and in the case of equation No. 6 it pulls the control voltage $E_c$ down to zero.

EXAMPLE B

As mentioned above, in the circuit of Example B different foreground color combinations are accommodated by varying selected potentiometers which control key constants in (1) the foreground blue limiting function and in (2) the background video control signal.

The limiting function for the foreground blue may be expressed as follows:

$$B \leq G + K_B(G-R)^+ + K_M(R-G)^+ \tag{7}$$

And the background video control function may be expressed as follows:

$$E_C = K_1 \{B' - C [K_2 (K_R R \text{ OR } K_G G + (1-K_2) (K_R R \text{ AND } K_G G)]\} \tag{8}$$

Where B' is the filtered blue foreground video, $K_2$ is a potentiometer whih selects between and combines the two terms including R and G, the foreground red and green video signals. The designation "OR" in function (8) indicates that the higher of $K_R R$ and $K_G G$ is selected; while the designation "AND" in function (8) indicates that both $K_GG$ and $K_RR$ must reach a certain level for it to be gated through, and therefore means that the lesser or the lower of $K_GG$ and $K_RR$ is selected. With regard to the significance of functions (7) and (8) let us first consider function (7). $K_B$ and $K_M$ represent potentiometers which may be varied to a value as low as 0. Note that with both $K_B$ and $K_M$ reduced to zero, function (7) is comparable to equation (1), and with the magenta control $K_M$ reduced to zero, function (7) approaches equation (3). For situations involving both cyan and magenta, function (7) is of course comparable to equation (5).

Now, considering the background control voltage $E_C$ as developed in equation (8), the variable potentiometer $K_2$ controls the predominance of the "OR" term or the "AND" term. In general the "AND" term is to be preferred as it provides a better transparency range if there is no cyan or magenta in the foreground scene, and for such conditions, the potentiometer $K_2$ would be reduced to zero or close to it. With magenta or cyan, however, the value of $K_2$ must be increased to near unity to prevent printthrough of the background. Also, some mixing of the two terms is helpful to compensate for color pick-up camera misalignment, in the not infrequent cases when this problem arises.

Concerning other aspects of the present invention, as will be developed below, it turns out that the final background video control function is advantageously a modified version of the "raw" background video signal as developed in the expressions set forth hereinabove. More specifically, it is preferable in the form of (1) a ramp function to provide, for example, appropriate shadow levels; (2) then a step function to accommodate varying brightness of the "blue screen"; and (3) finally a plateau to provide a constant background signal, despite varying brightness levels of the "blue screen".

Another subordinate aspect of the invention involves the provision of special controls to facilitate achievement of special effects. These include switches to permit obtaining (1) foreground with the blue screen shown; (2) foreground only with the blue screen matted out; (3) background only covering the entire screen; and (4) background with foreground blacked out leaving black holes in the background. A "Key-in" feature, with suitable window generation circuitry, permits the generation of a window in the background scene so that a small blue screen could be used on a large stage; while the "Key-out" signal derived from the background video control signal may be employed for certain special effects.

In the event a single color screen other than blue, such as a green screen, is used, as the background screen for the foreground video, the same principles as outlined above are still applicable in large part, but with appropriate video input interchange.

In the foregoing summary a brief description of the functions of the circuit have been given. Other objects, features and advantages of the invention will become apparent from a consideration of the following detailed description and from the drawings.

BRIEF DESCRIPTION OF THE DRAWINGS

FIGS. 2a and 2b are detailed logic circuit diagrams of one embodiment of the invention, implementing the video control Equation Nos. (1) through (6) set forth above;

FIGS. 3a and 3b are logic circuit diagrams of an alternative embodiment of the invention implementing Equations (7) and (8)

DETAILED DESCRIPTION

Figure 1:
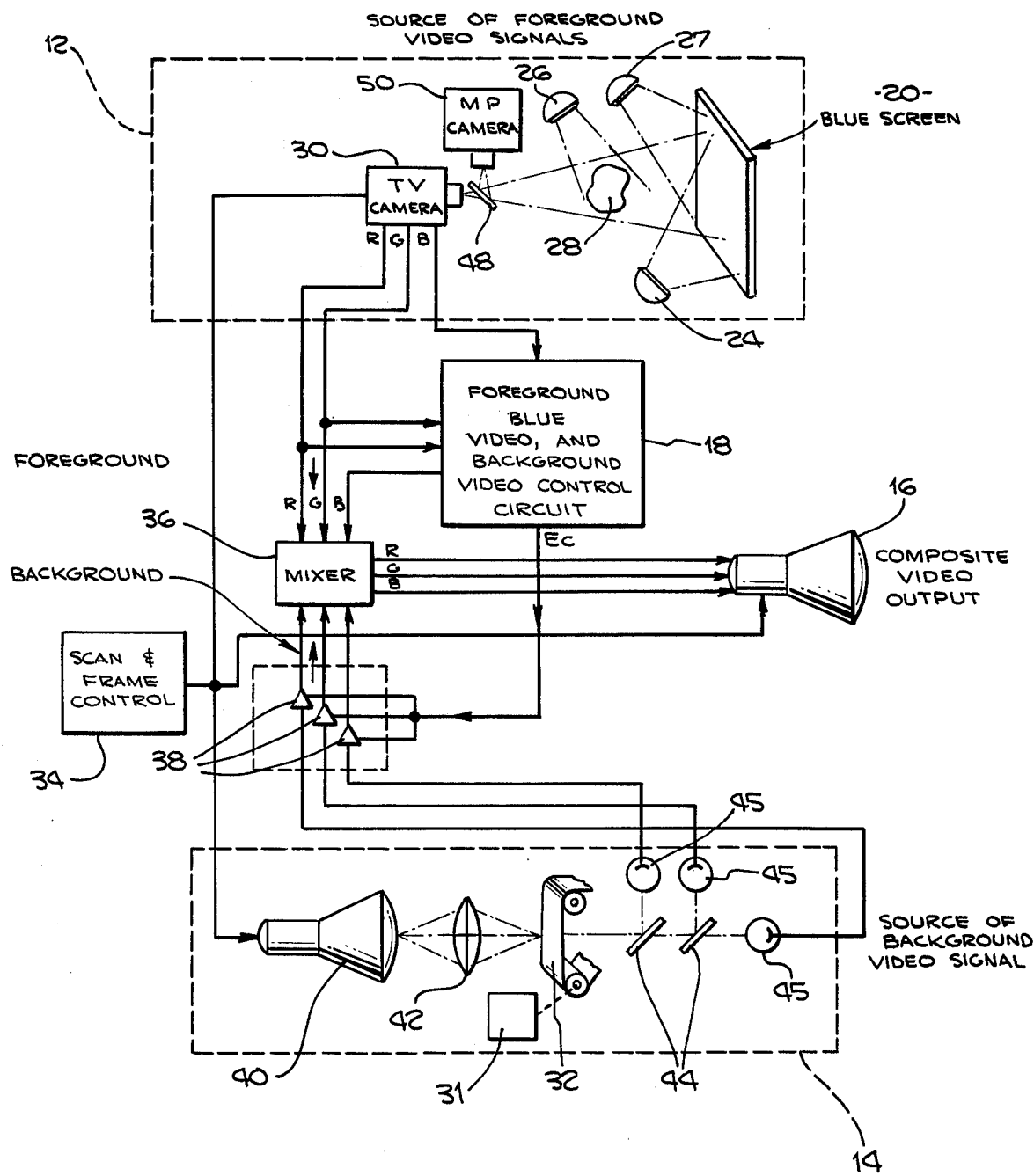
FIG. 1 is a block circuit diagram showing the major components of the present system.

With reference to the drawings, FIG. 1 shows a source of foreground video signals 12, a source of background video signals 14 and a monitor television unit 16 on which the composite video output is displayed.

The system in its broad outlines is known and is shown in my granted U.S. Pat. No. 3,595,987, cited above, by way of example. The invention as described in the present specification resides in the video control circuits represented by block 18 in FIG. 1 and shown in greater detail in FIGS. 2 and 3.

For completeness, some of the principal circuit components shown in FIG. 1 will be briefly described. Concerning the source of foreground video signals 12, an important element of the system is the single color screen 20, which is preferably of a very nearly pure blue, often referred to as a cobalt blue screen. It could also be of another pure color, such as green, but blue is preferred and is widely used. The screen is illuminated by lamps 22 and 24 with the lamp 26 illuminating the foreground object 28. The TV camera 30 scans the foreground object 28 with the blue screen 20 as background. By the techniques described in some detail hereinbelow the background video signals developed by circuit 14 and included on film 32 are substituted for the blue screen 20 as the picture is composited, and it is the resultant scene with the foreground object 28 and the background scene from film 32 which appears at the output video, and on monitor 16 where the composite video is displayed. Other circuits and components which appear in FIG. 1 include the scan and frame control circuit 34, the mixer circuit 36 which combines foreground and background video signals, the three gating amplifiers 38 which are controlled by the signal $E_c$ from circuit 18 to transmit or block to any desired degree the background video signals from circuit 14.

The source of video background signals 14 includes the flying spot scanner 40 and a lens 42 for focusing the light spot from tube 40 onto the film 32. The dichroic mirrors 44 split up the light beam into its blue, green, and red components, which are picked up by the photo cells 45 and transmitted to the respective amplifiers 38.

In addition to the TV camera 30 which forms part of the source of foreground video signals 12, a partially silvered mirror 48 may divert some of the image light from the foreground scene to the moving picture camera 50.

In the foregroing description of FIG. 1 a system which is well known in its overall elements has been described. Attention will now be focused in greater detail on the logic circuit diagram of FIG. 2 in which the novel features of the present invention are embodied and through which the implementation of the equations 1 through 6 set forth above is accomplished.

In FIG. 2 the foreground signals appear at terminals 52, 54 and 56 for the red, green and blue video signals, respectively. Similarly, the background video signals are supplied to input terminals 58, 60 and 62 for the red, green, and blue video signals, respectively. Following input amplification by amplifiers 64 and DC restoration by circuit 66, if necessary, the video signals are supplied to the voltage followers 68.

Now, because the background video signals are easier to trace than the foreground video signals, their circuit path will be briefly outlined. Specifically, the red, green, and blue background video signals are applied over lines 71, 72 and 73, respectively, to the multipliers 74, 76 and 78. In these multipliers, the background video signals are linearly modified from full level to zero in accordance with the input signal $E_c$ applied on the common control lead 80. From the multipliers 74 the background video is amplified by the operational amplifiers 82, 84 and 86 from which they appear in the reverse polarity. They are then supplied to the negative input terminals of each of the output combining operational amplifiers 88, 90 and 92, respectively where they are combined with foreground video signals to produce the composite video output which appears on terminals 94, 96 and 98 for the red, green, and blue composite signals, respectively.

Incidentally, concerning implementation of the circuit components shown in FIG. 2, all of the components shown by the triangular amplifier symbol may be implemented by National Semiconductor Part No. LH 0032. Of course, with different connections, the operational amplifier may be a difference amplifier, an inverting amplifier, a voltage follower, or perform other known functions. The multipliers 74, 76 and 78 may be implemented by Motorola Part No. MC 1595 and circuit 66 may be implemented by Signetics Part No. DG-190.

Now, in equations 1 through 6 involving Modes I, II, and III, a number of different terms were employed in developing the control signals, first for the control of the blue foreground video and second for the control of the background video in terms of $E_c$. In this connection, attention is directed to switches S1 and S2. As indicated by the legends on the drawings, switch S1 permits selection of one of the three clamp control voltages indicated by equations 1, 3 and 5, respectively, for switch positions 1, 2, and 3. Similarly, switch S2 provides on terminals 1, 2 and 3 the functions defined in equations 2, 4 and 6, respectively, for Modes I, II, and III, respectively.

Referring back to Equation No. (1), it may be noted that the blue foreground video is not permitted to rise above the green foreground video as modified by the constant C. With reference to the circuit diagram, note that lead 102 brings the foreground blue video to the clamp 104. Switch S1 provides the clamp voltage on lead 106 to the clamp circuit 104. In switch position 1, the foreground green video from lead 108 is supplied to the operational amplifier 110, with the output from amplifier 110 being supplied to S1 terminal No. 1 through the resistance network including a fixed resistor 112 and a variable resistor 114. With the amplifier 110 having a maximum gain of 1.5 and the variable resistor 114 having a total resistance twice that of the fixed resistance 112, the range of the potentiometer 114 is from 0.5 G to 1.5 G where "G" represents the instantaneous value of the foreground green video.

Switch position 2 of switch S1 implements equation 3 which requires a clamp limiting voltage equal to G + $(G-R)^+$. The "G" factor is provided by applying green video from lead 108 to the negative input terminal of operational amplifier 116. The $-G$ signal is then applied to the negative input terminal of operational amplifier 118 to combine it with the $(G-R)^+$ signal from amplifier 120. In this connection it may be noted that the amplifier 120 has as inputs the foreground red video signal on its negative input lead 122 and the foreground green video on its positive input lead 124. The block 126 which is labeled "zc" represents the zero clip function which prevents negative excursions of the signal under consideration. In each case the "zc" blocks may be combined with preceding operational amplifiers, to implement the indicated function. Lead 128 connects the output from the zero clip block 126 to the positive input of operational amplifier 118. The output from amplifier 118 then represents the function G + $(G-R)^+$ which is of course the function set forth in equation 3. Following transmission through the zero clip block 130, the output is connected to switch terminal 2 of switch S1.

Mode III for the control of foreground blue video is implemented by the input to contact 3 of switch S1. In comparing Equation No. (5) with Equation No. (3), it may be noted that the only additional term which is required is the $(R-G)^+$ term. This additional term is provided by the operational amplifier 134 having the red video connected to its positive input and the green video connected to the negative input. As mentioned above, the + sign following the $(R-G)^+$ term means that only positive values are employed. The zero clip block 136 indicates this function. The polarity of the $(R-G)^+$ term is reversed twice in combining it with the two other terms, G + $(G-R)^+$ of equation 5. This is accomplished in the circuit of FIG. 2 by amplifiers 138 and 140 with the connection from the zero clip block 136 leading to the negative terminal of amplifier 138, and the output from amplifier 138 also being connected to the negative input of amplifier 140. Accordingly, the output from amplifier 140 is the desired term set forth in equation No. 5. Of course, when switch S1 is set to switch position 3, the blue video is clamped to the level indicated in equation 5, and thus handles both light blue colors and purple or magenta.

Now, turning to switch S2, its function is to control the background video term which is designated $E_c$. As mentioned above, this control is applied to multipliers 74, 76, and 78 over line 80. As in the case of switch S1, switch S2 has three positions. Nos. 1, 2, and 3, corresponding to Mode I, Mode II, and Mode III, and Equations Nos. (2), (4), and (6) as set forth above.

In considering the implementation of equations 2, 4, and 6, initial attention will be given to the foreground video terms, and consideration will subsequently be given to the constants $K_1$ and $K_2$.

First, with reference to equation 2, the foreground video signals come in as the expression B-G. This term is developed by the differential amplifier 142 having the green video connected to its negative input and the blue video connected to its positive input. The B-G term from the output of amplifier 142 is transmitted through the zero clip block 144 and then connected to terminal switch 1 of switch S2.

Switch position No. 2 of S2 implements equation 4, which includes the $(B-G)^+$ term from which the positive value of the $(G-R)^+$ term is subtracted. Of course, both of these terms are available, with the $(B-G)^+$ term appearing at the output of zero clip block 144, and the term $(G-R)$ appearing at the output of the zero clip circuit 126. These two terms are combined in the differential amplifier 146 and the resultant terms are passed through the zero clip block 148 and connected to switch position No. 2 of S2.

The third terminal of switch S2 is employed in the implementation of equation 6. In this equation an additional $(R-G)^+$ term is required, in addition to the equation 4 terms which appeared at switch position No. 2 of switch S2. The $(R-G)^+$ term is available at the output of zero clip circuit 136 as discussed above, and this is routed via lead 150 to the negative input of differential amplifier 152, while the remainder of the expression of equation 6, which appeared at the output of zero clip 148, is coupled to the positive input of differential amplifier 152. From the output of amplifier 152 the signal is routed through the zero clip block 154 to terminal 3 of switch S2.

In the foregoing description switches S1 and S2 have been described separately. However, it is noted that in both S1 and both switches S1 and S2 contact position 1 relates to Mode I and contact positions 2 and 3 relate to Modes II and III. Accordingly, the mechanical coupling 182 may be provided to gang the switches S1 and S2 so that they are rotated concurrently to implement these three modes, Mode I, Mode II, and Mode III without the need for separately turning each of the two switches to the separate positions. However, to provide additional flexibility, and where fine control of all parameters is desired, the switches S1 and S2 may be separately operated.

Constants $K_1$ and $K_2$ which appear in each of the background involving equations $E_c$ as set forth in equations 2, 4 and 6 will now be considered. The constant $K_1$, which constitutes a multiplication factor, is implemented simply by a potentiometer designated $K_1$ in the drawings. Between the wiper arm of switch S2 and ground, any desired level or proportional amount of the signal appearing at S2 may be tapped off by wiper arm 156 of potentiometer $K_1$. The subtractive or offset term $K_2$ is implemented by potentiometer $K_2$ which is connected to the negative input of the differential amplifier 158. Of course, the positive input of amplifier 158 is connected to the wiper arm 156 of potentiometer $K_1$.

From the output of the differential amplifier 158 the signal is transmitted through the zero clip circuit 160, through the one volt limit circuit element 162 to the $E_c$ lead 80 which controls the background video by the application of control signals to the three multipliers 74, 76, and 78.

With regard to the shadow control potentiometers $K_1$ and $K_2$, it was mentioned above that these can be varied to provide either very dark intense shadows, or to eliminate shadows entirely. The effect of potentiometers $K_1$ and $K_2$ with various settings, in addition to the function of the differential amplifier 158 and the 1 volt limiting circuit 162, will now be considered in detail relative to these various desired shadow conditions.

Initially it must be noted that Equation No. 6 must cause full turn-on when the video is from the blue screen. For convenience, Equation No. 6 is repeated here.

$$E_c = K_1[(B-G)^+ - (G-R)^+ - (R-G)^+] - K_2 \tag{6}$$

In the blue screen region blue has a level of about 0.80 to 0.90, with green being at about a level of 0.15 to 0.20 and red having a level of approximately 0.05 to 0.10. Using the higher values for each color in Equation No. (6) set forth above, the following results set forth in Equation Nos. (9), (10) and (11) are obtained:

$$E_C = (0.9 - 0.2) - (0.2 - 0.1) - (0.1 - 0.2) \tag{9}$$

$$= (0.7) - (0.1) - (0) \tag{10}$$

$$= (0.6) \tag{11}$$

With multipliers 74, 76 and 78 requiring a 1.0 volt level for full turn-on and "0" for full turn-off, the constants $K_1$ and $K_2$ must be appropriately set to produce these values under the desired conditions.

Incidentally, the following equation is useful to express the shadow control function included in each of Equation Nos. (2), (4) and (6):

$$E_C = K_1(E_S) - K_2 \tag{12}$$

where $E_S$ is the normal background video control signal as developed in any one of the three positions of switch $S_2$.

TABLE NO. 1.

SHADOW CONTROL:
SETTING POTENTIOMETERS K-1 AND K-2
TO ACHIEVE SPECIAL SHADOW EFFECTS

| | | $K_1$ | $K_2$ | $E_{(S2)}$ | $E_{(K1)}$ | $E_{(158)}$ | $E_{c(80)}$ |
|---|---|---|---|---|---|---|---|
| normal | blue screen | 1.67× | 0 | 0.6 | 1.0 | 1.0 | 1.0 |
| | foreground | 1.67× | 0 | 0 | 0 | 0 | 0 |
| shadow emphasis | blue screen | 5× | 2v | 0.6 | 3.0 | 1.0 | 1.0 |
| | cut-over | 5× | 2v | 0.4 | 2.0 | 0 | 0 |
| | foreground | 5× | 2v | 0 | 0 | −2 | 0 |
| no shadows | blue screen | 10× | 0 | 0.6 | 6.0 | 6.0 | 1.0 |
| | normal shadow | 10× | 0 | 0.1 | 1.0 | 1.0 | 1.0 |
| | foreground | 10× | 0 | 0 | 0 | 0 | 0 |

Thus, referring to Table No. 1, the first two lines of the table deal with normal conditions. Under these conditions, the voltage E from the wiper arm of switch S2 has a level for the blue screen of 0.6. With resistor $K_1$ set at a multiplication factor of 1.67 and $K_2$ being set at substantially 0, the output from potentiometer (as amplified by amplifier 158) $K_1$ is 1.0, and the control voltage $E_c$ on control lead 80 also has the desired value of 1.0. Also, as may be observed from the second horizontal line in Table No. 1, with the same settings of the two potentiometers $K_1$ and $K_2$, when foreground objects are being scanned and the potential E from switch S2 is 0, the control voltage $E_c$ on lead 80 is also 0 and the background video is fully shut off.

For heavy shadow emphasis, the potentiometer $K_2$ is set to a rather significant value such as 2 volts. Potentiometer $K_1$ is then set to achieve a voltage $E_c$ on lead 80 of 1 volt in the region of the "blue screen" outside of the shadow area. As indicated in the first line under "Shadow Emphasis" in Table No. 1, this is achieved with potentiometer $K_1$ being set to a factor of 5 producing a voltage of 3.0 in operational amplifier 158 to be offset by the minus 2 volts from potentiometer $K_2$ thereby providing a +1 volt output from differential amplifier 158. Of course it must be noted that the amplifier 158 amplifies signals from potentiometer $K_1$ by a factor of 10, and in the foregoing description this amplification factor has been included in the discussion of the voltage from potentiometer $K_1$ so that it may be directly compared with the voltage from potentiometer $K_2$. Of course, the full range of voltage at the output of differential amplifier 158 is no longer from 1.0 to 0, but ranges from 1.0 to −2, with 0 being only ⅓ of the way towards −2. A shadow that drops the blue screen intensity to 70% of normal intensity therefore appears to be fully black. The foregoing analysis is shown on a step-by-step basis in the second and third lines of the "shadow emphasis" portion of Table No. 1, which are designated "cutover" and "foreground".

The final section of Table No. 1 is designated "No Shadows". In a shadow area, the equation No. 6 could result in a voltage E at switch S2 of only 0.1. This figure appears in the third column designated $E_{S2}$ on the line entitled "Normal Shadow", which is the second line from the bottom in Table No. 1. In order to raise the control voltage $E_c$ on line 80 up to the level of 1.0 volts, $K_1$ must have a value of 10. Under these conditions the unshadowed blue screen produces an output voltage of 6.0, which is of course clipped back to 1.0 volts by circuit 162. Accordingly, it may be seen that the achievement of the no-shadow effect has the side effect of compressing the range of transparency.

The mechanical coupling indication of the dash lines 170 between potentiometers $K_1$ and $K_2$ indicate that these potentiometers could, if desired, be intercoupled by a mechanical link. However, it will often be desirable to operate these potentiometers independently in order to achieve the desired effect. Further, if the two potentiometers are coupled together a lost motion linkage must be included so that $K_2$ may be retained at 0 level or close to it, for a substantial range of adjustment of $K_1$; thereafter the two potentiometers may be rotated together in proper proportion.

Turning now to a different aspect of the present circuitry, it is desired to bring the foreground video entirely down to zero when the blue screen is being scanned. However, the blue screen as used in motion pictures and television is not perfectly blue. The translucent types of blue screens lead some red and green, while the reflective types reflect some red and green. If we take the value of blue as being equal to 100%, then typical values for green and red are 20% and 10%, respectively. If not suppressed, this level of red and green from the foreground scene will cause a grey veiling over the darker areas of the background scene. The amplifiers 164, 166 and 168 are anti-veiling amplifiers which have the function of subtracting a voltage which is manually adjusted by the use of the potentiometers 170, 172 and 174 to the value of the leakage of the foreground video colors. The blue anti-veiling control 174 is set in the same manner as the red and green controls and serves the same anti-veiling purpose. However, the blue veiling does not result from screen leakage, but is a result of the manner in which the blue foreground video is controlled and developed.

The anti-veiling biases are employed only when the blue screen of the foreground area is being scanned. It is turned off when a solid foreground object is being scanned, and is reduced in intensity in the case of semi-transparent foreground objects such as smoke, crystal, etc. are being scanned. This variation of the veiling biases is accomplished by using the $E_c$ signal on lead 80 as the controlling voltage applied to the high point of the potentiometers 170, 172, and 174. Of course, it is not desired to reduce the foreground video below zero, and the zero clip blocks 176, 178, and 180 insure that this does not occur. In the absence of the inclusion of the function of these zero clip blocks 176, 178, and 180, the foreground video anti-veiling voltages might subtract from the background video and therefore distort the colors which appear in the composite picture.

Figure 2B:
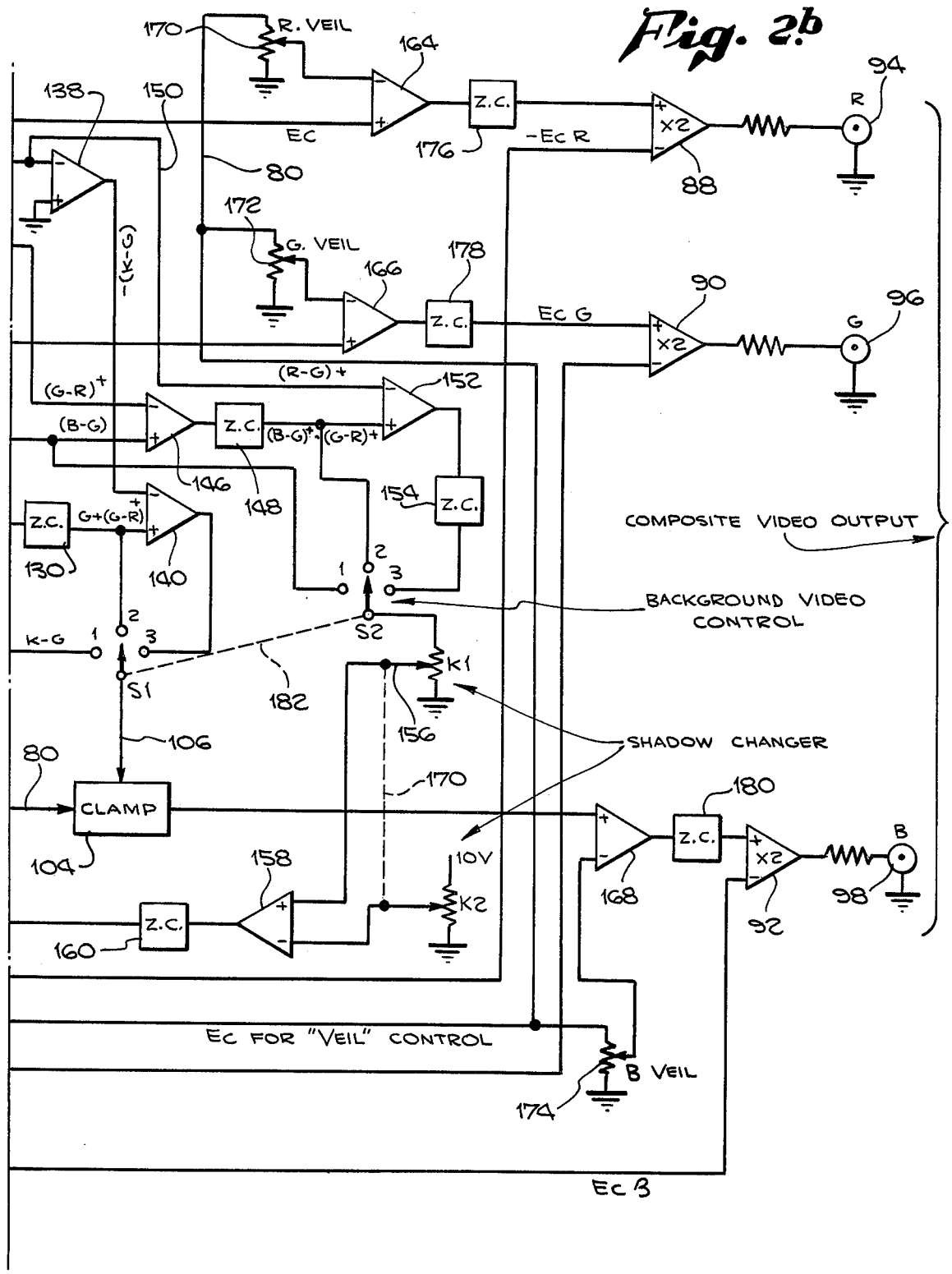

FIGS. 3A and 3B are similar in many respects to the circuit of FIGS. 2A and 2B. More specifically, the input foreground video signals are supplied at terminal 201 through 204 at the upper left-hand side of FIG. 3A, and the background video input is supplied on terminals 205 through 208 at the lower left-hand side of FIG. 3A. Incidentally, it may be noted that four input leads are provided for both the foreground and the background video inputs. These inputs may include either a luminance or contour input in addition to the red, green and blue. At the far right of FIG. 3B the composite video output signals are supplied to output terminals 209 through 212. Incidentally, as will be discussed below, switching arrangements are provided for transmitting only the background video, only the foreground video complete with the blue screen, only the foreground with the background blanked out, and only the background with the foreground blanked out, to the output terminals 209 through 212. Suitable input synchronization circuitry for the foreground and background video signals is provided by circuitry 214.

Now, in considering the remainder of the circuit of FIGS. 3A and 3B, attention will be directed primarily to those circuits which differ significantly from that shown in FIGS. 2A and 2B, and the step by step development of each individual signal will not be followed. Again, in a general way it may be noted that two principal control signals are developed. One of these is the control voltage $E_C$ which is modified to form $E_{BG}$ which establishes the magnitude of all four of the background video signals. The background video signals which are applied to input terminals 205 through 208, after amplification, appear on leads 215 through 218. The background control voltage $E_{BG}$ is supplied on lead 220 and is applied to each of the individual multiplier circuits 221 through 224 to establish the proper value of the background signals to complement and fill in around the foreground images supplied at input terminals 201 through 204.

One refinement included in the circuit of FIG. 3 is the use of a tapped delay line 226 to supply the signal $E_{BG}$ from line 228 to the control line 220 which directly controls the multipliers 221 through 224. The tapped delay line permits slight shifting of the timing of the background signal $E_{BG}$, which is generated from the foreground video signals, so that it is precisely synchronized with the background video signals which are being controlled.

Concerning the values of $E_{BG}$ and their effect on the background video signals, when $E_{BG}$ has a value of 1.0, the background video is gated through the multipliers 221 at full strength. However, with $E_{BG}$ at 0, no background video is passed by the multipliers 221 through 224, and with intermediate levels of $E_{BG}$ between 0 and 1, proportional amounts of the background video are transmitted through to provide the full range of transparency needed to accurately portray glassware, smoke, or moving objects, by way of example.

Some of the factors which went into the circuit changes which are employed in FIGS. 3A and 3B in the development of a modified background video control signal $E_{BG}$ include (1) the desire to reduce the noise by making the signal a function of only two input signals, at any one time, (2) providing a more complete range of transparency for conditions when light blue, cyan, or magenta colors are not present, and (3) accommodating slight misalignments of the color cameras that might otherwise produce undesired visual effects in the course of the compositing process when special foreground-background situations are present.

The new $E_{BG}$ development circuit includes as important components the AND circuit 230 and the OR circuit 232, in addition to the two input potentiometers designated $K_R$ and $K_G$, as well as the output potentiometer K2. The potentiometer K2 is also employed as will be set forth in the equations to be developed below.

Now, if there is no light blue or cyan, or magenta in the foreground scene, the potentiometer K2 will be moved down to its lowest point 234 so that it draws its signal directly from the AND gate 230. The output from the AND gate 230 selects the lowest of the output signals from potentiometers $K_G$ and $K_R$. The circuit 230 is accordingly not an "AND" gate in the normal digital sense in that it is either entirely on or entirely off depending on the level of the digital input signals; instead, the "AND" gate 230 is a circuit which transmits output signals at the level of the lowest of the two input signals which are provided. It may be recalled that one of the similar prior circuits which has been proposed made the background control signal a function only of the foreground blue, minus the foreground green video or a function of the green video. Unfortunately this had the effect of treating red and green objects differently and not providing a full range of transparency for both types of objects. Thus, with $E_{BG}$ (background control voltage) being a function of B minus G, for a green object in situations where a 50% transparency of the green object was appropriate, the background would still be completely blanked out; and on the other hand with a red object B minus G would have the proper 50% blue content (from the screen) in a 50% transparency situation, and 50% of the background scene would therefore be gated through.

The resultant function at the output of AND gate 230 at point 234 is as follows:

$$E_{C1} = (1-K_2)(K_R R \text{ AND } K_G G) \quad (13)$$

Now, the output from the OR circuit 232 gives the higher of the two input signals $K_G G$ and $K_R R$. This accommodates the situation when blue is equal to or greater than either red or green as in the cases of cyan or magenta wardrobe, by way of specific example. Under these circumstances the potentiometer K2 is moved toward the top of its resistor, toward the OR circuit 232 and draws its signal form terminal 236. The resultant function is as follows:

$$E_{C2} = K_2(K_R R \text{ OR } K_G G) \quad (14)$$

This function (14) has the property of diminishing the transparency range for plain green or plain red colors.

For certain types of scenes it is desirable to employ combinations of the outputs of OR circuit 232 and AND circuit 230, and in such cases the potentiometer K2 is set to an intermediate point. It turns out that this is a particularly useful function to have available to compensate for misalignment of the guns of the color camera when a white foreground object appears against a white background. Without this compensation, misalignment can give an additional dark line at the interface between the foreground and background.

The modified foreground blue B' is subtractively combined with the output from potentiometer K2 in operational amplifier 237, and $E_C$ before modification appears at the output of potentiometer K1.

The resultant function may be represented as follows:

$$E_C = K_1\{B' - C[K_2(K_R R \text{ OR } K_G G) + (1-K_2)(K_R R \text{ AND } K_G G)]\} \quad (8)$$

In considering the foregoing equation (8), it may be noted that, at any one time, the control signal $E_C$ is a function only of two foreground video signals, the blue, and either the red or the green. Accordingly the noise arising from combining several noisy signals, is substantially cut back as compared with the functions arising from the circuit of FIGS. 2A and 2B.

It has also been determined that the foreground blue input video has a particular high noise content. A special noise reduction circuit including the delay circuits 238 and 240, and the AND circuit 242 is employed to cancel out some of the high frequency noise. This is accomplished by using delay circuits having a delay of approximately 30 nanoseconds for circuit 238 and approximately 60 nanoseconds for circuit 240. This is equal to exactly 180° for signals of 17 megahertz, and eight and one-half megahertz, respectively, and thus cancels noise in the vicinity of these frequencies. It has been determined that, with this special foreground blue video noise reduction circuit, in combination with the last three equations being implemented as disclosed in FIG. 3, the moise levels are reduced to a point where they have no significant impairment effect on the resultant composite video output signal.

The shadow level control for the circuit of FIGS. 3A and 3B principally involves the potentiometers $K_1$ and $K_S$ in conjunction with the operational amplifier 246 (which acts as a switch) and the multiplier 248. Lead 250 provides a control level (normally one volt) for switching the amplifier 246. More specifically, when the input $E_C$ from the potentiometer $K_1$ is greater than the 1 volt supplied on lead 250, the operational amplifier 246 is disabled so that the shadow control potentiometer $K_S$ has no effect. However, when the voltage $E_C$ from potentiometer K2 drops below 1 volt, the amplifier 246 is switched to provide a short circuit between its output and the wiper arm of potentiometer $K_S$ thus making the multiplier 248 responsive to the setting of potentiometer $K_S$, as described below.

Figure 4:
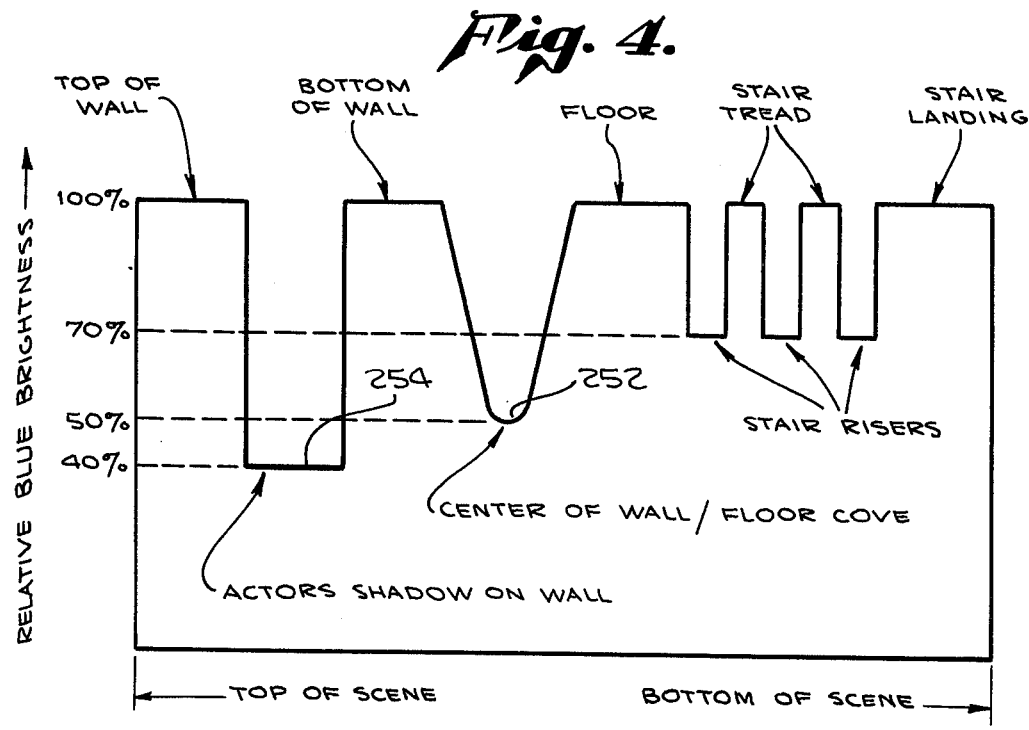

Reference will now be made to FIG. 4 which indicates the levels of blue brightness at various points across a typical scene which is colored blue to provide a "blue screen" effect. Of course, when reference is made to blue screen photography, it is not practical or possible to always use a uniformly illuminated actual blue screen. Instead, the set including a wall, a floor, and stairs might normally be included in the "blue screen" set. In order to improve the uniformity of illumination, a cove is employed to join the wall forming the rear of the set with the floor. Of course, the stairs, the wall, the floor, the cove, and all pieces of furniture in the set are colored with the same high purity blue color so that they can be illuminated and a background brought in, in accordance with the improved arrangements of the present invention. In FIG. 4 the relative blue brightness at different points along the set is plotted. Note that the top of the wall has a blue brightness of 100%, as does the bottom of the wall, and the floor, as well as the surfaces of the stair treads. However, as may be noted at point 252, the center of the wall/floor cove may drop to a relative brightness of only 50% of that on the flat surfaces of the wall and the floor. Region 254 may also be noted, with this region representing the relative blue brightness of about 40%, of the actor's shadow on the wall.

Now, it is desirable that, even in the less well-illuminated areas of the "blue screen" background that the background signal be fully gated through. In the absence of any special circuitry and assuming that the background control signal was set at unity for 100% blue brightness, then in the region of the wall/floor cove, as indicated by point 252 in FIG. 4, the background signal would be reduced to 50%; and more generally, the irregularities in the lighting of the entire scene would be immediately reflected by variations in the intensity of the background scene which is gated through. Of course, such a result is undesirable and produces a composite picture of very poor quality.

Figure 5:
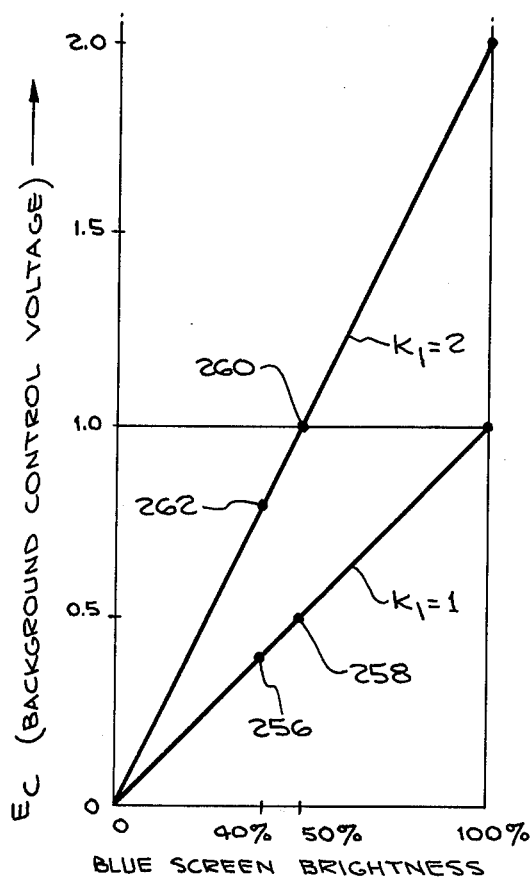
FIGS. 4 through 6 are plots of functions relating to the circuit of FIG. 3.

FIG. 5 is a plot showing the effect of the potentiometer K1 in changing the slope of the unmodified background control signal $E_C$. More particularly, with K1 set at unity, as indicated by the less steep curve of FIG. 5, $E_C$ would be directly proportional to the relative blue brightness. When used with the parameters shown in FIG. 4, the actor's shadows as indicated by point 256 would be properly reproduced; however, the point 258 represents the relative brightness of the cove, and it would appear as a somewhat lighter shadow in the composite picture.

In order to bring $E_C$ up to a level of 1.0 or greater for the entire background scene, including the cove, the potentiometer K1 may be set to a value of 2. Under these circumstances a blue screen brightness of 50% would produce a background control voltage $E_C$ of 1.0, as indicated by point 260 in FIG. 5. Of course, the wall, the floor, and even the stair risers having relative brightness above 50%, will provide background control voltages $E_C$ greater than unity which could result in undesired undue brightness of the background scene. As previously mentioned, this problem is overcome by the introduction of the limiter 282 which holds the modified background control signal $E_{BG}$ to a maximum value of 1.0.

Figure 6:
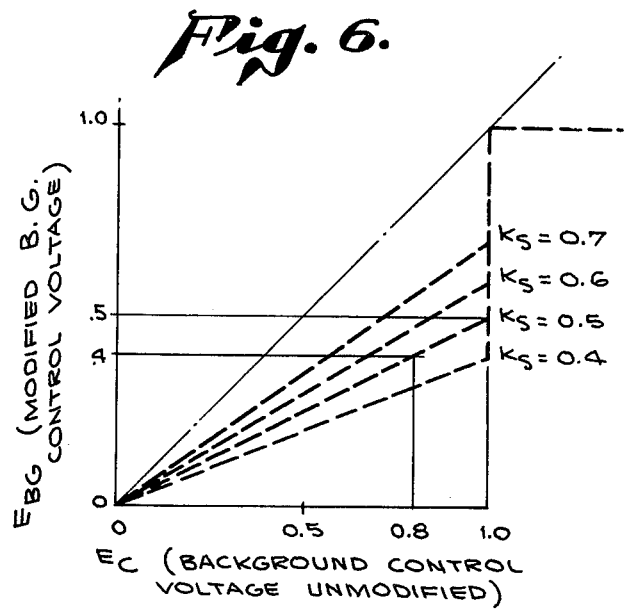

Reference will now be made to FIG. 6 which shows the relationship between the modified background control signal $E_{BG}$, and the unmodified background control signal $E_C$. First, before going into the details of FIG. 6, note that with potentiometer K1 set equal to 2, the shadows which have a relative brightness of about 40%, produce a background control voltage equal to about 0.8 as indicated by point 262 in FIG. 5. The shadows are therefore greatly reduced in intensity, and would hardly appear to be shadows at all. As mentioned above, the potentiometer $K_S$, the operational amplifier 246, and the multiplier 248 are employed to overcome this problem. More specifically, and as mentioned above, when the output $E_C$ from the potentiometer K1 is at 1.0, or greater, the operational amplifier 246 is disabled and no input is supplied to multiplier 248; instead, the unmodified control voltage $E_C$ is gated directly through multiplier 248. However, as soon as the output from potentiometer K1 drops to 1.0 or slightly below, the amplifier 246 switches, and the multiplier 248 is immediately responsive to $K_S$ and introduces a step function into the development of the modified background control voltage $E_{BG}$ as compared with $E_C$. Now, following through on the example of the shadows mentioned above, let us assume that $K_S$ is set to 0.5, or one half. Under these circumstances, the 0.8 level of the modified background control voltage $E_C$ produces a modified background control voltage $E_{BG}$ of 0.4. Referrring back to FIGS. 4 and 5, this is of course the original value of the shadows of the actors on the wall.

More generally, by using a value of $K_S$ which is the reciprocal of the value of the potentiometer K1, all shadows are restored to their normal intensity levels. On the other hand, if it is desired to make the shadows somewhat more intense, a slightly smaller value for $K_S$ is selected.

Thus, for specific example, using $K_S$ equal to 0.4, the shadow area which produced an $E_C$ of 0.8, would produce a modified background control voltage $E_{BG}$ equal to a little more than 0.3, giving the appearance of a more intense or darker shadow. Similarly, by using a value of $K_S$ equal to 0.6 or 0.7, the original shadow effect may be lightened or softened, or reduced in intensity.

The other critical parameter which must be established is the level of the blue clamp. It may be recalled from a consideration of FIG. 2, that the blue clamp value obtained from that circuit was as follows:

$$B_C \leq G + (G-R)^+ + (R-G)^{30} \tag{5}$$

A similar function is established for the circuit of FIGS. 3A and 3B. It is obtained principally through the use of the potentiometers $K_M$ and $K_B$, with the subscripts "M" and "B" standing for magenta and for blue, repsectively. More specifically, the circuit of FIG. 3 provides a blue clamp having the following value:

$$B_C \leq G + K_B(G-R)^+ + K_M(R-G)^+ \tag{7}$$

In examining the circuit of FIGS. 3A and 3B it may be seen that the blue video is clamped at circuits 241 and 242, and the clamping signal is provided on the negative input lead 244 to operational amplifier 241. To indicate how the limiting circuit works, we will assume tha the function of equation 7, which is generated at the input to operational amplifier 245, is equal to 0.5, with the range of the input foreground blue and the limiting function being from 0 to 1.0. It will further be assumed first that the level of the input foreground blue is ¼, or 0.25. Under these conditions, with 0.25 applied to the positive input of op. amp. 241 and 0.5 applied to the negative input, the output will be —0.25 volts. This negative voltage is eliminated by the "zero clip" circuit 266 so that the 0.25 level blue signal is gated directly through circuit 242. On the other hand, if the blue signal applied to op. amp. 241 is equal to ¾, or 0.75, then a positive 0.25 will pass through the zero clip circuit 266 and appear at the negative input of amplifier 242 to reduce the level of the blue signal to 0.5, the assumed level of the limiting function on lead 244.

As mentioned above, the circuit of FIGS. 3A and 3B is provided with a number of switches to permit analysis of the signals being processed, and also certain special effects. Switch S1, for example, when operated, permits the full foreground signal including the blue screen to be grated through to the output of the system. This is accomplished by disabling the blue clamp, $B_C$, and reducing it to 0. In operation the switch S1 applies —5 volts to the circuit at point 268, which serves to apply this substantial negative voltage to the positive terminals of operation amplifier 270 in the blue clamp circuit and operational amplifier 272 in the background control voltage generation circuit. With the blue clamp voltage being eliminated and the $B_C$ signal reduced to 0, a full foreground video including the blue screen signal is gated through to the output terminals 209 through 212.

Switch S2 is the background disabled circuit. In the normal position of S2 it supplies +12 volts to the collectors in the OR circuit 276. When the switch S2 is switched to the ground position, the collectors are grounded and $E_{BG}$ goes to 0. This of course disables the background. When S2 is switched, the matted foreground picture appears and the background is blanked out.

Switch S3 provides a full background representation with no foreground. This is accomplished with two switches, both of which are designated S3, and the first switch is also designated by reference numeral 278 while the second, which disables the foreground is designated by reference numeral 280. When the switch 278 is switched to its activated position, it connects +12 volts to the OR circuit 276, thus overriding any $E_C$ signals and fully energizing the background video by providing the maximum level of $E_{BG}$. Switch 280 disables the foreground by connecting the positive terminal of operational amplifier 282 to −5 volts. This reduces the output from amplifier 282 and that from limiter 284 to 0, and this factor when applied to the multipliers 291 through 294 reduces their outputs to 0.

When switch S4 is operated, it has the same effect as switch 280 forming part of the action of S3. Accordingly, the foreground video is disabled and therefore blanked out, while the background is enabled as though the foreground were present. This leaves "holes" or blank black spaces in the background scene. For certain special effects, for example, if it is desired to fill in the figure of a foreground person, with a single color or a desired variegated signal, switch S4 is helpful in accomplishing this purpose.

A "key-in" terminal 298 is provided at the bottom of FIG. 3B, and a video window generator circuit 300 is connected to this key-in terminal. As indicated by the small signal diagram adjacent to key-in terminal 298, when a signal of +1 volts is applied to the key-in terminal, the foreground signal is shut off, and the background video is turned on. This key-in feature may serve a number of useful purposes. For example, if it is only desired to use the blue screen effect in a certain small portion of the overall representation area, a video window generator may be provided to completely disable the foreground signal for the greater portion of the picture, but to permit control to be delegated to the circuitry of FIG. 3A in its normal operating mode, for the small area where control in accordance with normal blue screen practices is intended. Accordingly, for this small picture area, the window generator will lower the voltage to 0 at the key-in terminal 298, but will supply a +1 volt level signal to the key-in terminal during the remainder of the video signal representation. In addition, if desired, a ramp voltage may be applied to the key-in terminal 298, and this could have the effect of making a foreground actor gradually become invisible.

A key-out terminal 302 may also be provided to provide an indication as to when the background signal enabling voltage $E_{BG}$ is on and off. This may be employed for special effects, and to provide timing signals for controlling the duration of signals applied to the unit.

Incidentally, for completeness, reference will be made once again to Equation (7) set forth above. It will now be re-written in a slightly modified form, as follows:

$$E_C = 2.5K_1'\{B' - 1.5 [K_2(K_RR \text{ OR } K_GG) + (1-K_2)(K_RR \text{ AND } K_GG)]\} \quad (15)$$

This equation is merely a slightly revised form of Equation (7). Specifically, the amplifier 272 actually provides gain of 2.5; and the potentiometer K1 therefore has a range of from 0 to 2.5 volts. The factor 1.5 has been substituted for the constant "C" in equation (7), and this 1.5 factor is provided by the gain of amplifier 237.

Concerning references to colors in the present specification and in accordance with general usage in the motion picture and television industry, the visible spectrum, which extends from 400 millimicrons to 700 millimicrons, is divided into three color bands. The blue band extends from 400 to 500 millimicrons; the green band from 500 to 600 millimicrons, and the red band from 600 to 700 millimicrons. The band from 500 to 700 millimicrons is the yellow or "minus blue" range; the magenta or "minus green band" extends from 400 to 500 and from 600 to 700 millimicrons; and the 400 to 600 millimicron band is known as the "minus red" or cyan band.

In closing, it may be noted that the circuits of FIGS. 2 and 3 are merely specific logic circuit implementations of the equations 1 through 6 and 7 and 8 respectively, and the other functions which have been described herein. In addition, of course, the sources of foreground and background video signals could be live TV cameras, video tape, film scanned by a suitable scanner, or any combinations thereof, or of other known sources of video signals. It may also be noted that persons skilled in the art could implement the present invention using different logic circuit configurations and other known electronic techniques without departing from the spirit and scope of the invention.

I claim:

1. A comprehensive electronic compositing system of the single color screen type where said single color is a first one of the primary colors, comprising:
    a source of color foreground video signals, including at least signals representing red, green and blue;
    a source of background video signals;
    means for developing a clamping voltage having an instantaneous value equal to a function of the instantaneous value of a second one of said colors plus a function of the difference of the smaller of said two remaining colors subtracted from the larger of said two remaining colors;
    means for developing a background control voltage having a value which is a function of the difference between the value of said first foreground video color less a function of the second and third foreground colors;
    means for limiting the value of the foreground video signal of said first color in accordance with said clamping voltage;
    means for controlling the levels of the background video signals in accordance with the value of said background control voltage; and
    means for combining the foreground and background video signals as modified to produce composite foreground and background video signals representing a composite picture.

2. A comprehensive electronic compositing system as defined in claim 1 further comprising:
    means for changing said background control function when the foreground scene includes colors having high levels of said first color, as compared to when said foreground scene includes colors having low levels of said first color.

3. A comprehensive electronic compositing system as defined in claim 1 further comprising:
means for reducing the effect of variations in the brightness of the single color forming the background for the foreground scene.

4. A comprehensive electronic compositing system as defined in claim 1 further comprising:
means for varying the intensity of shadows originating in the foreground scene, in the composite video representation.

5. A comprehensive electronic compositing system as defined in claim 1 further comprising:
means for developing a final background control signal from the raw background control signal which includes a ramp function at low levels of the background control signal, a pleateau or limited zone for the final background control signal as the raw signal increases to higher levels, and a step function between said ramp function and said plateau zone; whereby variations in the blue screen intensity do not affect the level of the background video signals and shadow effects may be appropriately carried into the composite video representations.

6. A comprehensive electronic compositing system as defined in claim 1 wherein said means for developing a background control voltage includes means responsive to the relative levels of the instantaneous values of said second and third colors for reducing noise content introduced into said control voltage by dropping dependence on either said second or said third foreground video colors while determining the value of said background control voltage only from the instantaneous values of the other two foreground video colors.

7. The system defined in claim 1 further including means responsive to the level of the control voltage $E_c$ for introducing an anti-veiling correction voltage to each of the foreground video signals.

8. The system defined in claim 1 wherein said means for developing a clamping voltage includes means for selectively deleting said difference function.

9. A system as defined in claim 1 wherein said single color is blue.

10. A system defined in claim 1 further including means responsive to the level of the background control voltage for introducing an anti-veiling correction voltage to the individual foreground video signals which include veiling signals derived from the screen which could otherwise veil the background image.

11. An electronic compositing system of the single color screen type comprising:
a source of red, green, and blue foreground video signals;
a source of red, green, and blue background video signals;
means for developing a first clamping voltage for the foreground video signal of said single color for use with foreground objects which are not substantially the same hue as said single color;
means for developing a second clamping voltage for the foreground video signal of said single color for use with foreground objects having a hue approaching said single color;
means for developing a first background video control voltage for use with foreground objects which do not include high content of said single color;
means for developing a second background video control voltage for use with foreground objects having a high content of said single color;
means for changing from said first clamping voltage to said second clamping voltage;
means for changing from said first background video control voltage to said second background video control voltage;
means for limiting the value of the foreground video signal of said single color in accordance with the selected clamping voltage;
means for controlling the levels of the background video signals in accordance with the value of the selected background control voltage; and
means for combining the foreground and background video signals as modified to produce composite red, green, and blue video signals.

12. An electronic compositing system as defined in claim 11 further comprising:
means for concurrently changing said clamping voltage and said background video control voltage.

13. An electronic compositing system of the single color screen type comprising:
a source of red, green, and blue foreground video signals;
a source of background video signals;
means for developing a first background video control function for use with foreground objects which do not include high content of said single color;
means for developing a second background video control function for use with foreground objects having a high content of said single color;
means for changing from said first background video control function to said second background video control function;
means for controlling the levels of the background video signals in accordance with the value of the selected background control voltage; and
means for combining the foreground and background video signals as modified to produce composite foreground and background video signals.

14. An electronic compositing system as defined in claim 13 further including means for modifying said background video control voltage to selectively emphasize or reduce shadow effects.

15. An electronic compositing system as defined in claim 14 wherein said modifying means includes means for multiplying the background control voltage by a variable desired factor to accommodate brightness variations of the single color screen, and means for modifying the background video control voltage to restore shadow effects to desired levels.

16. A system as defined in claim 13 wherein means are provided for generating said background video control signal substantially in accordance with the following function:

$$E_C = K_1 \{B' - C [K_2(K_R R \text{ OR } K_G G) + (1-K_2)(K_R R \text{ AND } K_G G)]\}$$

where: $K_1$ and $K_2$ are constants determined by variable electronic controls, and C is a circuit constant;
B' is the foreground video signal of the single color screen;
R and G represent the second and third foreground video colors; and $K_R$ and $K_G$ are constants which are established by variable electronic controls.

17. A system as defined in claim 13 further comprising:
   means for selectively providing at the output from the system, only the foreground video including the single color screen or background;
   means for selectively outputting the matted foreground video without reproducing either the blue screen or the background video;
   means for selectively outputting the complete background video with all elements of the foreground scene eliminated;
   means for selectively outputting the background video modified in accordance with said background control signal and with the foreground video blacked out;
   means for supplying a window generation signal to the system to permit the use of a reduced size blue screen in a larger size set; and
   means for outputting a key signal synchronized with the background video control signal.

18. An electronic compositing system of the special color screen or background type comprising:
   a source of red, green, and blue foreground video signals;
   a source of background video signals;
   means for generating a raw background video control voltage to turn on the background video when the foreground video signal is from the special color screen, and to turn the background video off when foreground objects are being scanned;
   means for multiplying the raw video control signal by a preset varible factor;
   means for counteracting the effect of said multiplying means in a predetermined low intensity range to reproduce shadow levels at a desired intensity;
   means for using the resultant signal to control the level of the background video signals; and
   means for combining the foreground and background video signals as modified to produce composite red, green, and blue video signals.

19. A system as defined in claim 18 further comprising:
   means for limiting the background video control signal to avoid undesired excessive brightness and variations in brightness of the background video signals.

20. A system as defined in claim 18 wherein said system includes means for developing a final background video control signal from the raw background video control signal which includes a ramp function at low levels of the background control signal, a plateau or limited zone for the final background control signal as the raw signal increases to higher levels, and a step function between the ramp function and the plateau zone; whereby variations in the blue screen intensity do not affect the level of the background video signals and shadow effects may be appropriately carried into the composite video representations.

21. An electronic compositing system of the single color type comprising:
   a source of red, green, and blue foreground video signals;
   a source of background video signals;
   means for developing a clamping voltage for said foreground signal of said single color;
   means for developing a background video signal control voltage;
   means for limiting the value of the foreground video signal of said single color in accordance with said clamping voltage;
   means for controlling said background video signals; in accordance with said control voltage;
   means for combining the foreground and background video signals as modified to produce composite video signals; and
   means for providing an individual anti-veiling correction voltage to subtract screen impurities from each foreground color function derived so as to contain screen impurities.

22. An electronic compositing system as defined in claim 21 further comprising means for varying said anti-veiling correction voltages in accordance with the level of said background video signal control voltage.

23. An electronic compositing system of the single color screen type comprising:
   a source of red, green, and blue foreground video signals;
   a source of background video signals;
   means for developing a background video control signal from said foreground video signals;
   means including a limiter for controlling the levels of the background video signals in accordance with the value of said background control signal;
   means for combining the foreground and background video signals as modified to produce composite foreground and background video signal representations; and
   means for supplying a window generation signal to the system through said limiter to selectively disable the foreground video in certain areas of the representation outside of the window, to permit the use of a reduced size single color screen in a larger size set, without introducing a visible discontinuity into the representation.

24. An electronic compositing system of the single color screen type comprising:
   a source of red, green, and blue foreground video signals;
   a source of background video signals;
   means for developing a background video control signal from said foreground video signals;
   means for controlling the levels of the background video signals in accordance with the value of said background control signal; and
   means for combining the foreground and background video signals as modified to produce composite foreground and background video signal representations;
   means for selectively outputting the background video modified by said background control voltage with the foreground video blacked out; and
   means for outputting a control signal synchronized with the background video control signal.

25. An electronic image compositing system as defined in claim 24 wherein said means for outputting the control signals includes means outputting a varying signal corresponding substantially to said background control signal.

26. A low noise electronic compositing system of the single color type comprising:
   a source of red, green, and blue foreground video signals;
   a source of background video signals;

means for developing a background video signal control voltage which is a function of all three input foreground signals, including a filtered version of the foreground blue, and the instantaneous value of only one of the other two foreground video colors depending on their relative levels;

means for controlling said background video signals in accordance with said control voltage; and means for combining the foreground and background video signals as modified to produce composite foreground and background video signals.

27. A comprehensive electronic compositing system of the single color screen type, comprising:

a source of color foreground video signals, including at least signals representing red, green and blue;

a source of background video signals;

means for developing a background control voltage having a value which is a function of the difference between the value of one of said foreground video colors and a function of the second and the third foreground colors;

means for controlling the levels of the background video signals in accordance with the value of said background control voltage; and means for combining the foreground and background video signals as modified to produce composite foreground and background video signals representing a composite picture.

* * * * *